March 15, 1960 D. L. CURTIS 2,928,601

ARITHMETIC UNITS FOR DECIMAL CODED BINARY COMPUTERS

Filed March 25, 1952 3 Sheets-Sheet 1

INVENTOR.
DANIEL L. CURTIS,
BY
Seymour M. Rosenberg
ATTORNEY.

ARITHMETIC UNITS FOR DECIMAL CODED BINARY COMPUTERS

Filed March 25, 1952 3 Sheets-Sheet 2

INVENTOR.
DANIEL L. CURTIS,
BY
Seymour M. Rosenberg
ATTORNEY.

March 15, 1960 D. L. CURTIS 2,928,601

ARITHMETIC UNITS FOR DECIMAL CODED BINARY COMPUTERS

Filed March 25, 1952 3 Sheets-Sheet 3

INVENTOR.
DANIEL L. CURTIS,
BY
Seymour M. Rosenberg
ATTORNEY.

United States Patent Office 2,928,601

Patented Mar. 15, 1960

2,928,601

ARITHMETIC UNITS FOR DECIMAL CODED BINARY COMPUTERS

Daniel L. Curtis, Manhattan Beach, Calif., assignor, by mesne assignments, to Hughes Aircraft Company, a corporation of Delaware Application March 25, 1952, Serial No. 278,408

5 Claims. (Cl. 235—169)

This invention relates to arithmetic units for binary coded decimal computers and more particularly to arithmetic units for electronically combining electrical signals representing binary coded decimal numbers, respectively, and producing an electrical output signal representing the result in binary coded decimal form.

It is recognized in the computer art that in many applications of digital computers it is desirable to utilize a coding system which preserves the fundamental economy of the binary system while retaining the convenience of the decimal system. One of the most obvious binary codes which may be utilized in a binary coded decimal system is the conventional binary code including four binary digits weighted 8, 4, 2, 1, respectively. However, the problem of producing a binary coded decimal result from an arithmetic operation performed on binary numbers thus weighted is complicated by several factors.

Firstly, since a coding system utilizing a weighting of 8, 4, 2, 1 has a radix of sixteen, an arithmetic operation may produce an operational result which has a magnitude of ten or greater, and is, therefore, incompatable with binary coded decimal notation wherein the radix used is ten. Secondly, a carry digit will be present in the true binary result of an arithmetic operation only if the result is equal to or greater than sixteen, whereas in a binary coded decimal system a carry digit should occur whenever the arithmetic result is larger than nine. Thirdly, although the arithmetic operation will produce the desired carry digit if the arithmetic order is "add" and the result is sixteen or greater, or if the arithmetic order is "subtract" and the result is negative, the true binary result will differ from the desired binary coded decimal result by a factor of six, which represents the difference between the radix of ten and the radix of sixteen. It is apparent, therefore, that in order to utilize the proposed binary weighting in a binary coded decimal system, the binary result produced by an arithmetic operation must at times be corrected from true binary form to the desired binary coded decimal forms.

Accordingly, the present invention provides arithmetic units for electronically performing an arithmetic operation upon electrical signals representing binary coded decimal numbers and producing an electrical output signal representing the arithmetic result in binary coded decimal form by correcting an electrical signal representing the true binary result of the operation when the true binary result is not already in binary coded decimal form. Each of the several embodiments of the invention herein disclosed includes a correction control network responsive to the electrical output signal for producing an electrical control signal when the output signal corresponds to a binary number which is not in the desired binary coded decimal form, and electrical circuit means normally operable for electronically storing the output signal, but being operable in response to a control signal from the transfer network for storing an electrical signal corresponding to the binary coded decimal equivalent of the binary number corresponding to the output signal.

According to one embodiment of the invention, a serial arithmetic unit is provided which serially performs the operation of "add" or "subtract" upon two binary coded decimal numbers applied as electrical signals, and stores an electrical signal representing the true binary operational result. A correction control circuit is then utilized for determining if a correction should be made. Under the control of the correction control circuit, a correction transfer circuit functions to correct the stored signal to binary coded decimal form when a correction is indicated.

Another embodiment of the present invention provides a parallel arithmetic element for electronically performing an arithmetic operation upon a pair of electrical signals representing, respectively, the two groups of binary digits of corresponding decades of two binary coded decimal numbers and storing an electrical signal representing the true binary result of the operation. A correction control network is then utilized for sensing if the result represented by the stored signal is in binary coded decimal form. If a correction is required, the stored signal is converted through the use of a correction transfer network.

Still another embodiment of the invention provides a high speed parallel arithmetic unit which stores an electrical signal representing the binary coded decimal result of an arithmetic operation electronically performed on two electrical signals representing two binary coded decimal numbers, without performing the intermediate step of storing the true binary result of the operation. Thus, the result signal which is stored is the true binary result signal if the true binary result is in binary coded decimal form, or is a corrected result signal if the true binary result is not in binary coded decimal form.

It is, therefore, an object of this invention to provide arithmetic units for electronically performing an arithmetic operation upon a plurality of electrical signals representing binary coded decimal numbers, respectively, and producing an electrical signal representing the arithmetic result in binary coded decimal form.

Another object of this invention is to provide arithmetic units for transforming into binary coded decimal form an electrical signal representing the true binary result of an arithmetic operation electronically performed upon two electrical signals representing two binary coded decimal numbers, respectively.

It is an additional object of this invention to provide arithmetic units for producing an electrical signal representing the true binary result of an arithmetic operation electronically performed upon two electrical signals representing two binary coded decimal numbers, respectively, and for converting the true binary result signal to binary decimal coded form when the result signal is not already in binary coded decimal form.

A further object of this invention is to provide electronic arithmetic units for simultaneously performing arithmetic operations on two groups of binary coded decimal digits, representing two decimal digits, respectively, and producing the binary coded decimal result of the arithmetic operation.

It is also an object of this invention to provide an electronic serial arithmetic unit for serially performing arithmetic operations upon successive pairs of corresponding binary digits of each decade of two binary coded decimal numbers and presenting the binary result for each decade in binary coded decimal form.

A still further object of this invention is to provide an electronic parallel arithmetic unit for simultaneously performing arithmetic operations on all the corresponding pairs of binary digits of corresponding decades of two binary coded decimal numbers, and presenting each decade digit of the result of the operations in binary coded decimal form.

It is still an additional object of this invention to provide arithmetic units for electrically performing an arithmetic operation on two electrical signals corresponding to two binary coded decimal numbers, respectively, storing an electrical signal corresponding to the true binary form of the result of the arithmetic operation, and correcting the result signal to binary coded decimal form when the stored result signal is not in binary coded decimal form.

Still another object of this invention is to provide a parallel arithmetic unit for arithmetically combining corresponding decades of two binary coded decimal numbers, producing the binary coded decimal result thereof, and storing the binary coded decimal result.

The novel features which are believed to be characteristic of the invention, both as to its organization and method of operation, together with further objects and advantages thereof, will be better understood from the following description considered in connection with the accompanying drawings, in which several embodiments of the invention are illustrated by way of examples. It is to be expressly understood, however, that the drawings are for the purpose of illustration and description only, and are not intended as a definition of the limits of the invention.

Figure 5:
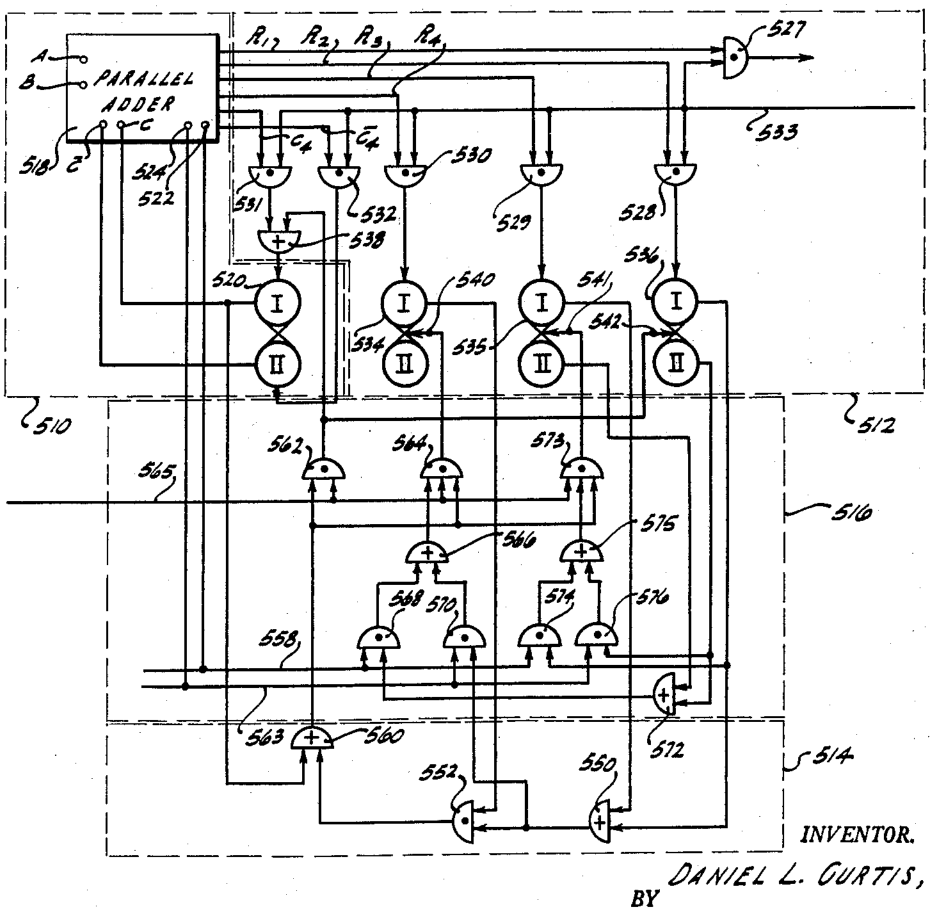
Figure 6:
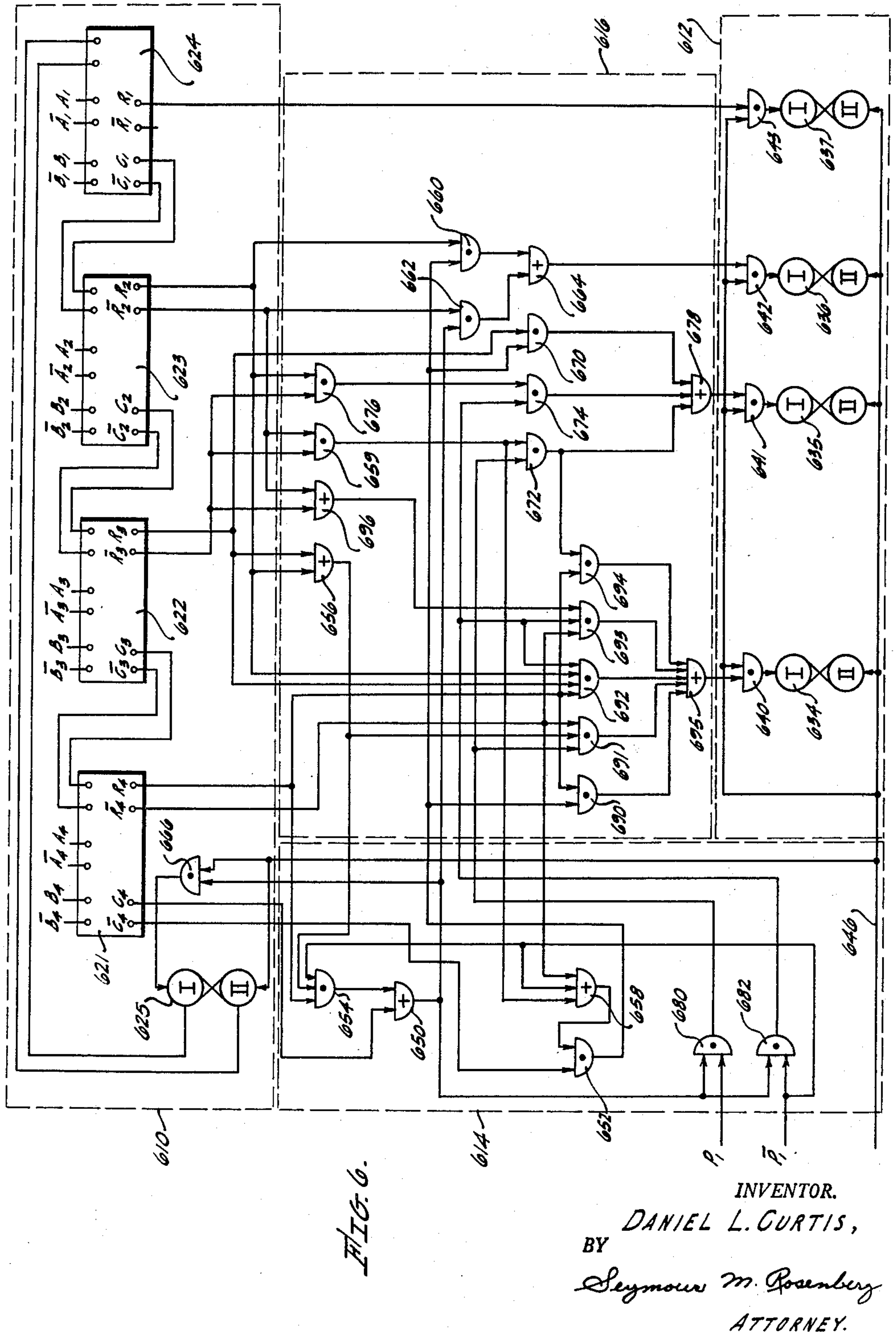

Fig. 5 is a schematic diagram of a parallel binary coded decimal arithmetic unit, according to this invention, which stores and corrects the true binary result of an arithmetic operation in order to present the result in binary coded decimal form; and Fig. 6 is a schematic diagram of a parallel binary coded decimal arithmetic unit, according to this invention, which corrects the true binary result of an arithmetic operation to binary coded decimal form, and stores the binary coded decimal result.

Figures 1, 2:
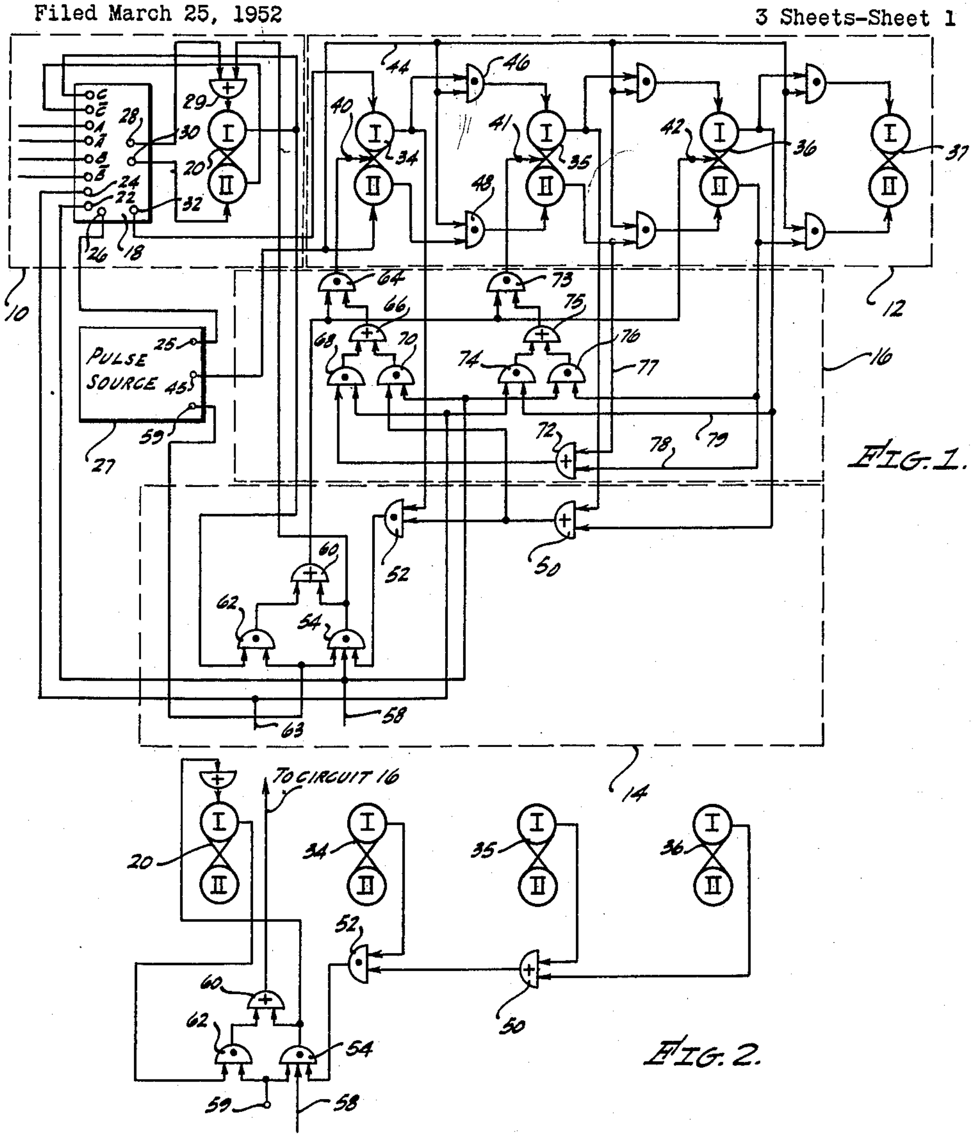
Fig. 1 is a schematic diagram of a serial binary coded decimal arithmetic unit, according to this invention.
Fig. 2 is a schematic diagram of the correction control circuit of Fig. 1.

Referring now to the drawings, there is shown in Fig. 1 a serial binary coded decimal arithmetic unit, according to this invention, which serially performs an arithmetic operation of either addition or subtraction upon a plurality of binary coded decimal numbers and presents the result of the arithmetic operation in binary coded decimal form. The arithmetic unit includes four basic elements, namely, a serial binary arithmetic element 10, a register 12, a correction control circuit 14, and a correction transfer circuit 16.

Arithmetic element 10 includes a serial binary adder-subtracter 18 and a carry digit flip-flop or bistable multivibrator 20. Adder-subtracter 18 may be of the type disclosed in copending U.S. patent application, Serial Number 189,318, by Eldred C. Nelson, filed October 10, 1050, and now abandoned, for "Arithmetic Units for Digital Computers." Adder-subtracter 18, as shown in Fig. 1, includes six input terminals A, $\bar{A}$, B, $\bar{B}$, C and $\bar{C}$, three control terminals 22, 24 and 26, and three output terminals 28, 30 and 32.

Input terminals A and $\bar{A}$ are utilized for serially receiving a pair of complementary electrical signals, respectively, representing the first binary coded decimal number to be operated upon, while a pair of complementary electrical signals representing a second binary coded decimal number to be operated upon, are serially impressed on input terminals B and $\bar{B}$, respectively. Input terminals C and $\bar{C}$, on the other hand, are connected to the output terminals of the I and II sections, respectively, of flip-flop 20. The particular designation of the conduction sections of flip-flops included in this invention by the Roman numerals I and II will be more fully described in connection with the description below of the output circuits of adder-subtracter 18.

Control terminals 22 and 24 of adder-subtracter 18 are provided for receiving the order signals indicating the arithmetic operations of "add" and "subtract," respectively, whereas control terminal 26 is connected to an output terminal 25 of a pulse source 27. Adder-subtracter 18 is rendered operative upon application of a control pulse to terminal 26 from source 27, thereby energizing the output circuitry of arithmetic element 10.

Output terminals 28 and 30, at which appear a pair of complementary electrical signals, respectively, representing the binary carry digit resulting from an arithmetic operation performed in adder-subtracter 18, are connected to one input terminal of an "or" gate 29 and to the section II input terminal of carry digit flip-flop 20, respectively. An output terminal of gate 29 is, in turn, connected to the section I input terminal of flip-flop 20. Output terminal 32, at which appears an electrical signal representing the binary result digit of the arithmetic operation, is connected to a section I input terminal of a first flip-flop stage 34 of register 12.

In operation, flip-flop 20 receives and stores the carry digit signals produced at terminals 28 and 30 during each step of the arithmetic operation performed by adder-subtracter 18, and reimpresses the signals thus stored on input terminals C and $\bar{C}$ of adder-subtracter 18 for inclusion in the immediately succeeding step of the arithmetic operation. The action of carry digit flip-flop 20 is such that a negative pulse signal appearing on output terminal 28 will result in conduction in section II of flip-flop 20 which, in turn, results in a high level output signal from section I and a low level output signal from section II. Conversely, a negative pulse signal appearing at output terminal 30 will result in conduction of section I, thereby producing a high level output signal from section II and a low level output signal from section I.

Since the signals appearing on output terminals 28 and 30 are binary complements, and since a negative pulse appearing on terminal 28 indicates that the step of the arithmetic operation being performed has resulted in a carry, conduction of section II, or in other words, a high level output signal from section I, indicates that a carry digit has been stored in flip-flop 20. It will be apparent to those skilled in the art that the choice of a negative pulse to indicate a carry output from adder-subtractor 18, and the choice of a high level output signal from section I to indicate the storage of a carry digit, are arbitrary selections, and are not to be taken as a limit to the invention.

The foregoing terminology and notation applied to flip-flop 20 will also apply to all other flip-flops described in the present invention. In other words, negative pulses will be utilized for triggering all flip-flops, and conduction in section II, resulting in a high level output signal from section I of a flip-flop, will indicate that the binary digit 1 is stored in the flip-flop, whereas conduction in section I, resulting in a high potential level output from section II, will indicate that the binary digit 0 is stored in the flip-flop.

Referring again to Fig. 1, register 12 may be any conventional shifting register which includes a plurality of bistable flip-flops and associated shifting circuitry arranged in successive stages. Register 12 is shown to include four flip-flops successively designated 34, 35, 36 and 37. Each of flip-flops 34 through 37 includes an input and an output terminal associated with each of the I and II conducting sections. In addition, flip-flops 34 through 36 are provided with additional input terminals 40 through 42, respectively. Application of a negative pulse signal to any one of input terminals 40 through 42 results in a reversal of the conduction states of the respective flip-flop, regardless of the existing conduction states.

It is to be understood, of course, that the flip-flops of register 12 may utilize conventional vacuum tube circuitry or passive element circuitry to attain bistable operation. It is to be further understood that although register 12 is shown to include only four register or flip-flop stages, additional register stages may be included for storing signals representing the binary coded decimal numbers resulting from previous arithmetic operations, or from previous steps of the operation being performed by the arithmetic unit of the present invention.

The associated shifting circuitry of register 12 includes a shift pulse bus 44 which is connected to an output teminal 45 of pulse source 27, and a plurality of shift gate matrices, one matrix being provided for each register stage for intercoupling the output terminals of the associated flip-flop to the input terminals of the flip-flop of the succeeding register stage. Since the last register stage of a shifting register of the type described has no succeeding stage, it is apparent that no shifting matrix is required for the final stage. Thus, as may be seen from Fig. 1, three shifting matrices are sufficient to shift a four binary digit number into flip-flops 34 through 37 of register 12.

Since the shifting matrices between each pair of register stages are identical, for purposes of clarity, only the matrix intercoupling flip-flops 34 and 35 will be described, it being understood that the description applies equally as well to the shifting matrices intercoupling the other pairs of register stages. This matrix incudes two conventional "and" gates 46 and 48, each having two input terminals and one output terminal. The output terminal of section I of flip-flop 34 is electrically connected to one input terminal of gate 46, the output terminal of gate 46 being connected to the input terminal of section I of flip-flop 35. Similarly, gate 48 has one input terminal connected to the output terminal of section II of flip-flop 34 and its output terminal connected to the input terminal of section II of flip-flop 35. Shift pulse bus 44 is connected to the other input terminal of each of gates 46 and 48, and to the input terminal of section II of flip-flop 34.

This completes the description of serial binary arithmetic element 10 and shifting register 12 which alone are sufficient to serially add or subtract two binary coded decimal numbers and store the operational result. However, as will be apparent later when the operation of this embodiment of the invention is described, the result may not be in the binary coded decimal form desired. Accordingly, correction control circuit 14 and correction transfer circuit 16 are provided for respectively generating a correction signal and applying the correction signal to the stages of register 12.

Correction control circuit 14 includes a plurality of conventional "and" and "or" gates which are utilized to "sense" the operational result stored in register 12 and carry digit flip-flop 20 in order to generate a correction signal only when appropriate. More particularly, control circuit 14 includes an "or" gate 50 having a first input terminal connected to the section I output terminal of flip-flop 36 and a second input terminal connected to the section I output terminal of flip-flop 35. Gate 50 also includes an output terminal which is connected to a first input terminal of an "and" gate 52, a second input terminal of gate 52 being connected to the section I output of flip-flop 34.

Gate 52 has an output terminal connected to one input terminal of a three input terminal "and" gate 54, the other two input terminals of gate 54 being connected to an "add" control signal bus 58 and to an output terminal 59 of pulse source 27, respectively. An output terminal of gate 54 is, in turn, connected to one input terminal of an "or" gate 60 and to a second input terminal of "or" gate 29. A second input terminal of gate 60 is connected to an output terminal of a two input terminal "and" gate 62, the two input terminals of gate 62 being connected to output terminal 59 of pulse source 27 and to the output terminal of section I of flip-flop 20, respectively. Gate 60 also includes an output terminal at which the desired control signal will appear under certain predetermined conditions, as will be described later.

The output terminal of gate 60 is coupled through correction transfer circuit 16 to input terminals 40 through 42 of register flip-flops 34 through 36. Correction transfer crcuit 16 includes a plurality of "and" and "or" gates arranged to selectively apply correction signals generated in correction control circuit 14 to input terminals 40 through 42. Thus, as shown in Fig. 1, the output of gate 60 is connected directly to input terminal 42 of flip-flop 36 and to a first input terminal of an "and" gate 64, the output terminal of gate 64 being connected to input terminal 40 of flip-flop 34.

A second input terminal of gate 64 is connected to an output terminal of a two input terminal "or" gate 66 having its input terminals respectively connected to an output terminal of each of two "and" gates 68 and 70. Gate 68 includes two input terminals connected to a "subtract" control signal bus 63 and an output terminal of a two input terminal "or" gate 72, respectively. One input terminal of gate 72 is connected by a conductor 77 to the section II output terminal of flip-flop 35, the other input terminal being connected by a conductor 78 to the section II output terminal of flip-flop 36. The two input terminals of gate 70, on the other hand, are connected to "add" control signal bus 58 and to the output terminal of gate 50, respectively.

The output terminal of gate 60 of correction control circuit 14 is also connected to a first input terminal of an "and" gate 73, an output terminal of which is connected to input terminal 41 of register flip-flop 35. A second input terminal of gate 73 is connected to an output terminal of a two input terminal "or" gate 75 having its two input terminals respectively connected to an output terminal of each of two "and" gates 74 and 76. Gate 74 is provided with two input terminals connected to "subtract" control signal bus 63 and by a conductor 79 to the section I output terminal of flip-flop 36, respectively, while gate 76 includes two input terminals connected to "add" control signal bus 58 and the section II output terminal of flip-flop 36, respectively.

This completes the description of the circuitry included in the serial binary coded decimal arithmetic unit shown in Fig. 1. It is to be expressly understood that modifications may be made in the gating circuitry of correction control circuit 14 and correction transfer circuit 16 without departing from the spirit of the invention, as will become apparent from the following operational description of this embodiment of the invention.

The operation of the serial embodiment of the invention shown in Fig. 1 will be disclosed in connection with Figs. 1, 2, 3 and 4. The operation of arithmetic element 10 and register 12 in producing an electrical output signal corresponding to the true binary result of the arithmetic operation performed will be described utilizing Fig. 1 and Fig. 4, the latter figure illustrating the relative time displacement of the control pulses received from pulse source 27. For purposes of clarity, the operation of correction control circuit 14 and correction transfer circuit 16 will be described in connection with Figs. 2 and 3, respectively.

It will be assumed, for purposes of description, that arithmetic operations are to be performed on two binary coded decimal numbers each having two decades; i.e., a units decade and a tens decade. In operation, the binary coded decimal digits representing the units decade of the numbers to be operated upon are serially applied to input terminal A, $\bar{A}$, B and $\bar{B}$ of adder-subtracter 18 as two pairs of complementary electrical signals. In addition an operation signal level is applied to either "add" bus 58, and hence to terminal 22 of adder-subtracter 18, or to "subtract" bus 63, and hence to terminal 24 of adder-subtracter 18, for indicating the arithmetic operation to be performed.

It will be assumed for purposes of illustration that a high potential level applied at input terminal A and a complementary low potential level applied at input terminal Ā will indicate the binary digit 1. Conversely, a high potential level applied at input terminal Ā and a complementary low potential level applied at input terminal A represents the binary digit 0. Similar notation is, of course, applied to the complementary binary digit signals applied to input terminals B and B̄, and will also pertain to the signal levels present on "add" and "subtract" busses 58 and 63. For example, a high potential level on bus 58 and a complementary low potential level on bus 63 will indicate that the arithmetic operation to be performed is that of addition, while a high potential level on bus 63 and a complementary low potential level on bus 58 will indicate that the arithmetic operation to be performed is that of subtraction.

Figure 4:
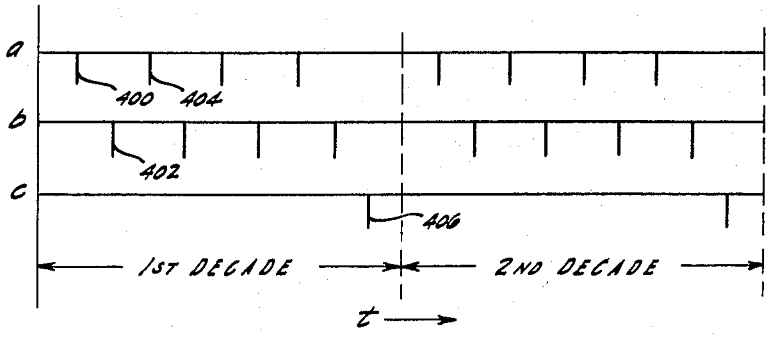
Fig. 4 is a composite diagram of the waveforms of electrical pulses which may be utilized to control the operation of the arithmetic unit shown in Fig. 1.

Regardless of whether the operation of "add" or "subtract" is to be performed, and before adder-subtracter 18 is initially operated, a negative shift pulse signal is applied to shift bus 44 to preset flip-flop 34 with the binary digit 0, thereby preparing register 12 to receive the operational output signal of adder-subtracter 18. As shown in Fig. 4, where waveforms *a*, *b* and *c* represent shift pulses, operation pulses and correction pulses, respectively, the various pulses are time delayed with respect to each other. The initial shift pulse applied to register 12 is herein shown as pulse 400. It will be noted that the pulses illustrated are broken up into the units and tens decade in which the pulses are applied. The succeeding pulse generated by pulse source 27 is an operation pulse 402 which is applied to terminal 26 of adder-subtractor 18.

When operation pulse 402 is applied, adder-subtractor 18 performs the desired arithmetic operation on the voltage levels corresponding to the first binary digit of the units decade of each of the binary coded decimal numbers. If a carry digit results from this initial step of the operation, a negative pulse appears on terminal 28 of adder-subtractor 18 for triggering carry digit flip-flop 20 to produce a high potential level at the output terminal of section I, thereby indicating a carry digit has been stored. Conversely, if no carry digit results from the initial step of the arithmetic operation performed, a negative pulse is applied to section II of flip-flop 20, the low potential level resulting at the output terminal of section I indicating no carry digit has been stored.

If the initial arithmetic step performed produced the binary result digit 1, a negative pulse is applied from terminal 32 of adder-subtracter 18 to the section I input terminal of register flip-flop 34, thereby triggering the flip-flop to produce a high potential level at the output terminal of section I. Since only the binary digit 1 is represented as an output from adder-subtracter 18, a binary result digit of 0 from the initial arithmetic operation produces no result output signal, and flip-flop 34, therefore, remains conducting in state I, the low level output from state I signifying that the binary digit 0 has been stored.

After the operation on the first pair of binary digits of the units decade of the two binary coded decimal numbers has taken place, another shift pulse is applied to shift bus 44, this pulse being shown in Fig. 4 as pulse 404. Application of shift pulse 404 to register 12 serves two functions. Firstly, the binary result digit stored in flip-flop 34 is shifted to flip-flop 35 upon the application of the pulse to gates 46 and 48. Secondly, shift pulse 404 is applied to the input terminal of section II of flip-flop 34 for resetting the first register stage to binary digit 0, thereby preparing register 12 for storing the result of the succeeding arithmetic operational step.

A second operation pulse is now applied to adder-subtracter 18 for producing the arithmetic result of a second arithmetic operational step. The second arithmetic step is performed upon the signals representing the second pair of binary digits of the units decade of the applied binary coded decimal numbers and the signal representing the binary carry digit which resulted from the preceding step and which was stored in flip-flop 20.

The signals representing the binary result and carry digits produced by the second serial arithmetic operational step are again stored in flip-flops 34 and 20, respectively, and another shift pulse is applied to register 12 to shift the binary digits stored in flip-flops 34 and 35 to flip-flops 35 and 36, respectively, and to reset flip-flop 34 for the next succeeding arithmetic operational step.

The operation of arithmetic element 10 and register 12 is repeated until the signals representing the four binary digits of the units decade of each of the binary coded decimal numbers have been operated upon, and the signals representing the true binary result of the operation have been stored in register flip-flops 34 through 37, and in carry flip-flop 20.

It is important to note that although the operational result stored in register 12 is the true binary result of the arithmetic operation, it may not be in binary coded decimal form, as desired. If the binary result stored in register 12 is less than ten, and if carry digit flip-flop 20 contains no carry digit, the true binary result is also the binary coded decimal result desired. On the other hand, if the binary number stored in register 12 is equal to or greater than ten, or if flip-flop 20 contains a carry digit, the true binary number stored is not in binary coded decimal form and must, therefore, be corrected in order to conform to the binary coded decimal results desired.

Consistent with true binary notation, the number stored in register flip-flops 37 through 34 and carry digit flip-flop 20 may be written as $$N=a_0 2^0+a_1 2^1+a_2 2^2+a_3 3^3+c 2^4 \quad (1)$$

where coefficients $a_0$ through $a_3$ and $c$ may have the value 0 or 1 depending upon the potential level at the output terminals of section I of flip-flops 37 through 34 and flip-flop 20, respectively. It is apparent from the above equation that the radix of the binary number stored in flip-flops 34 through 37 is sixteen. In other words, the binary number sixteen is the first number in the ascending numerical series which triggers flip-flops 34 through 37 to the conducting states representing the binary number zero.

In binary coded decimal notation, on the other hand, a radix of ten is utilized for counting and storing numbers. In other words, the binary coded decimal digits representing the numbers zero to nine are the same as the true binary digits representing the same numbers. However, in a binary coded decimal system, the number ten is represented by the binary number zero plus a carry digit.

From the foregoing discussion it is apparent that four binary digits are capable of representing sixteen true binary numbers, whereas only ten binary numbers are required for each decade of a binary coded decimal system. It follows, therefore, that there are sixteen minus ten or six unused true binary codes which may be stored in four flip-flops of a binary coded decimal system. It must also follow, then, that for the arithmetic operation of "add," the binary number "six" must be added to a true binary number equal to or greater than ten in order to carry the result past the six unused binary codes or digit combinations, and thereby transform the result into the proper binary coded decimal number plus a carry digit. The carry digit may then be included in the arithmetic operation to be performed on the succeeding decade.

A similar true binary to binary coded decimal conversion may be performed when the arithmetic operation "subtract" produces a true binary result inconsistent with binary coded decimal notation. When the binary result is the number nine or less, and no carry digit is produced, the true binary and binary coded decimal forms of the result are identical, and no correction is necessary. If, however, the operation "subtract" produces a carry digit, which indicates a negative quantity, a conversion is made to binary coded decimal form by subtracting the binary digits representing the number six from the true binary result produced.

The only apparent difference, therefore, between the binary coded decimal conversion for "add" and "subtract" is that the binary number six is added to the binary result of the arithmetic operation when the order is "add" and the true binary result is ten or greater (considering the carry as a fifth binary result digit), while the binary number six is subtracted from the binary result of the arithmetic operation when the order is "subtract" and a carry digit has been produced.

The foregoing discussion will be more clearly understood when taken in connection with the following examples which illustrate the relationship of the true binary result to the desired binary coded decimal result for various combinations of binary coded decimal numbers applied to the input terminals of adder-subtracter 18.

The first example to be considered will be that in which two binary coded decimal numbers, the sum of which is less than ten, are added. Thus:

| | |
|---|---|
| 6= | 0110 |
| 3= | 0011 |
| 9 | 01001=9 |

Since the sum is less than 10, the true binary result produced is also the binary coded decimal result desired.

If the sum of the two binary coded decimal numbers is ten or larger, but less than sixteen, a conversion from true binary to binary coded decimal must occur. Thus:

| | |
|---|---|
| 5= | 0101 |
| +8= | 1000 |
| 13 or 3 plus carry 1 | 01101=true binary number thirteen. |

Since the result is ten or larger, the binary digit six is added to obtain a binary coded decimal result.

| | |
|---|---|
| | 01101 |
| +6= | 0110 |
| | 10011 |

or decimal coded binary number three plus a carry to be included in the arithmetic operation on the next decade, as desired.

The conversion which occurs when the sum of two binary coded decimal numbers is sixteen or greater is as follows:

| | |
|---|---|
| 9 | 1001 |
| +9 | 1001 |
| 18 or 8 plus carry 1 | 10010 or true binary number eighteen. |

Since a carry occurred, as represented by the fifth binary digit, the binary number six must again be added to obtain a binary coded decimal result, as shown below:

| | |
|---|---|
| | 10010 |
| +6 | 0110 |
| | 11000 |

or binary coded decimal number eight plus a carry to be included in the arithmetic operation of the next decade, as desired.

Assuming that the arithmetic operation performed is that of "subtract," the first example illustrated is one wherein a smaller binary coded decimal number is subtracted from a larger binary coded decimal number.

| | |
|---|---|
| 6 | 0110 |
| −3 | 0011 |
| 3 | 00011=3 |

In this instance the true binary result is identical to the binary coded decimal result desired, since no carry occurred in the true binary result.

However, when a larger number is subtracted from a smaller number, the resulting carry digit indicates that the binary digit six should be subtracted from the true binary result as follows:

| | |
|---|---|
| 4 | 0100 |
| −7 | 0111 |
| | 11101 |
| −6 | 0110 |
| | 10111 |

or binary coded decimal number seven plus a carry digit as denoted by the fifth place binary digit. A carry digit resulting from subtraction is ordinarily included in the "subtract" operation on the succeeding decade of binary coded decimal numbers. However, if a carry digit results after the last decade has been operated upon, the carry indicates that the binary coded decimal result is negative, and may be obtained by merely taking the tens complement of the decimal number represented in the register. That this is consistent with radix ten notation may be shown by the following examples:

| | |
|---|---|
| 34 | 4=14−10 |
| −17 | −7= 7 |
| 17 | −3= 7−10 |

In each case the digit seven is subtracted from the digit four. In the first case, the carry digit is included in the subtract operation on the tens decade, where a smaller number is subtracted from a larger number, and the answer is, therefore, seventeen. In the second case shown above, the answer is minus three because the carry resulting without a succeeding decade indicates the answer is negative and numerically equal to the tens complement of seven, or three.

It is clear from the above illustrative examples that in order to present the binary result of an arithmetic operation in the desired binary coded decimal form, the arithmetic unit should include means for sensing when a binary correction or conversion is required, and means for adding or subtracting the binary number six from the true binary result when a correction is indicated. Accordingly, correction control circuit 14 and correction transfer circuit 16 are provided for respectively sensing when a conversion should be made and making the conversion to the desired decimal coded binary form.

The operation of correction control circuit 14 will be disclosed utilizing Fig. 2, which shows the correction control circuit of Fig. 1 and the associated connections and circuitry of register 12 and arithmetic element 10. In the operation of the serially operated embodiment of the invention, a correction pulse is generated by pulse source 27 and applied to each of gates 54 and 62 after the desired arithmetic operation of "add" or "subtract" has been serially performed upon the first decade of the binary coded decimal input signals to adder-subtracter 18. This pulse is shown in Fig. 4 as pulse 406, and occurs after the last operation pulse for the decade has been generated.

Upon application of the correction pulse to gates 54 and 62, correction control circuit 14 determines or senses whether a correction signal should be applied to correction transfer circuit 16, in accordance with the conditions for correction set forth above. It may be recalled that a correction signal is to be applied to correction transfer circuit 16 only when the arithmetic operation has resulted in a carry digit stored in flip-flop 20 or when the operational order is "add" and a binary number larger than nine is stored in register flip-flops 34 through 37. Since a binary number larger than nine is stored only when the section I output terminals of flip-flop 34 and either of flip-flops 35 and 36 have a high potential level thereon, the conditions for applying a correction signal may be conveniently expressed by the Boolean equation $$s=p\bar{P}_1C_c+pP_1C_c+pP_1R_4(R_2+R_3) \qquad (1)$$

where
$s$=correction signal output from gate 60
$p$=correction pulse from pulse source 27
$C_c$=high level output section I, flip-flop 20
$R_4$=high level output section I, flip-flop 34
$R_3$=high level output section I, flip-flop 35
$R_2$=high level output section I, flip-flop 36
$P_1$=arithmetic order "add"
$\bar{P}_1$=arithmetic order "subtract"

Equation 1 may be stated more simply by combining the first and second terms according to Boolean notation, thereby reducing the number of gates utilized for mechanizing the equation.

$$s=pC_c+pP_1R_4(R_2+R_3) \qquad (2)$$

Simply stated, Equation 2 signifies that a correction signal is produced whenever a correction pulse is applied to correction control circuit 14 and either a carry digit is stored in flip-flop 20, or the order is "add' and the binary number in register 12 is ten or greater.

The correction control circuit shown in Fig. 2 illustrates one circuit by which Equation 2 may be mechanized, the output signals appearing at the outputs of gates 62 and 54 representing the first and second terms, respectively, of Equation 2. It is evident, therefore, that the signal appearing at the output of "or" gate 60 represents the solution of Equation 2, or expressed differently, a correction signal will appear at the output of gate 60 only under the conditions imposed by Equation 2. It is well to note at this time that the output of gate 54 is connected to the input terminal of section I of flip-flop 20 for storing a carry digit in flip-flop 20 when a binary correction is to be made because a true binary result larger than nine but smaller than sixteen is stored in register 12.

If it is assumed that the binary result stored in register 12 and carry digit flip-flop 20 is not in the desired binary coded decimal form, a correction signal is applied from correction control circuit 14 to transfer correction circuit 16 for combining the binary number six and the stored binary result. Whether six is added or subtracted is, of course, dependent upon the operational order of "add" or "subtract" which was utilized in obtaining the stored result.

If the true binary result stored in register 12 is expressed by the binary digits $r_4r_3r_2r_1$, and the desired binary coded decimal result of the arithmetic operation is expressed by the binary digits $r_{4c}r_{3c}r_{2c}r_{1c}$, the following Boolean equations may be used to define the relationship of the binary coded decimal digits to the true binary digits. Since the addition of six to the true binary result differs from the subtraction of six from the true binary result, two sets of equations may be utilized to represent the operational orders of "add" and "subtract."

| Add | Subtract |
|---|---|
| $r_{1c}=r_1$<br>$r_{2c}=\bar{r}_2$<br>$r_{3c}=(\bar{r}_3\bar{r}_2)+(r_3r_2)$<br>$r_{4c}=r_4(r_3\bar{r}_2)+r_4(r_2+r_3)$ | $r_{1c}=r_1$<br>$r_{2c}=\bar{r}_2$<br>$r_{3c}=(r_3\bar{r}_2)+(\bar{r}_3r_2)$<br>$r_{4c}=r_4(r_2r_3)+r_4(\bar{r}_2+\bar{r}_3)$ |

The above equations define the binary coded decimal digits which result from the binary correction. However, in the present invention, it is not necessary to know what digits should be present in register 12 after a correction has been made, but only when a correction-transfer or change should be made in each of the register flip-flops. Thus, the above equations can be expressed more simply in terms of rules for changes to be made in the conduction states of flip-flops 34 through 37, as follows:

| Add | Subtract |
|---|---|
| $r_1$—do not change<br>$r_2$—change<br>$r_3$—change if $r_2=0(\bar{r}_3\bar{r}_2)$<br>$r_4$—change if $r_2$ or $r_3=1$ $\bar{r}_4(r_2+r_3)$. | $r_1$—do not change<br>$r_2$—change<br>$r_3$—change if $r_2=1(\bar{r}_3r_2)$<br>$r_4$—change if $r_2$ or $r_3=0$ $\bar{r}_4(\bar{r}_2+\bar{r}_3)$. |

It is now apparent that in order to convert a true binary number to binary coded decimal form, the conduction state of flip-flop 37 remains unchanged, the conduction state of flip-flop 36 is changed, and the conduction states of flip-flops 35 and 34 may be changed, depending upon the operational order of "add" or "subtract" and the binary digits stored in the earlier flip-flop stages of register 12. The rules for correction transfer may, therefore, be mechanized by utilizing a plurality of "and" and "or" gates in an arrangement such as that shown, for example, in correction transfer circuit 16.

Figure 3:
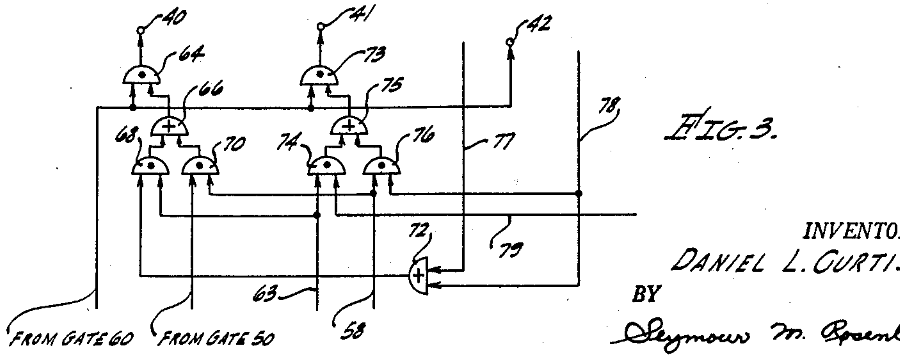
Fig. 3 is a schematic diagram of the correction transfer circuit of Fig. 1.

Referring now to Fig. 3 which shows correction transfer circuit 16 detached from the remainder of the serial embodiment of the invention, a correction signal generated at the output terminal of gate 60 is applied directly to input terminal 42 of flip-flop 36 for changing the conduction state of the flip-flop regardless of whether the operational order is "add" or "subtract."

The correction signal is also applied to gates 64 and 73, which in turn function to change the conduction states of flip-flops 34 and 35, respectively, providing that a high level potential is present at the outputs of "or" gates 66 and 75, respectively. The output potential of gate 75 is at a high level only when the order is "add" and the section II output potential of flip-flop 36 is high, or when the order is "subtract" and the section I output potential of flip-flop 36 is high. Similarly, the output of gate 66 will have a high potential level only when the order is "add" and the section I output potential of either of flip-flops 35 and 36 is high, or when the order is "subtract" and the section II output potential level of either of flip-flops 35 and 36 is high. Since according to the notation previously set forth, the section I output potential of a flip-flop is at a high level only when the binary digit 1 is stored in the flip-flop, the arrangement of gates illustrated in Fig. 3 will change the conduction states of flip-flops 34 through 36 in accordance with the above stated rules for change, thereby producing the desired binary coded decimal result in register 12.

Since no change is made in the conduction state of flip-flop 37, or stated differently, since the first binary digit of the decimal coded binary result is always the same as the first binary digit of the true binary result, it is evident that the serial embodiment of the invention shown in Fig. 1 need not include flip-flop 37. For example, if a separate storage element is utilized for storing the binary coded decimal results of the arithmetic operation, the signal corresponding to the first binary result digit produced by adder-subtracter 18 may be shifted through register 12 to flip-flop 36 in the manner previously described and then shifted directly to the storage element upon application of the last shift pulse for the decade being operated upon.

After the correction to binary coded decimal form has been made, the serial embodiment may perform similar arithmetic operations on the tens decade of the two binary coded decimal numbers applied as electrical signals at the input terminals of adder-subtracter 18. The binary coded decimal number signal resulting from the operation on the units decade may, therefore, be shifted out of register 12 to a storage element, not shown, or may be shifted into additional register stages of register 12, if desired.

This completes the description of the serial embodiment of the invention shown in Fig. 1. It should be expressly understood that the particular arrangements of gating circuitry utilized in correction control circuit 14 and correction transfer circuit 16 are not intended as limits to the invention, since variations may be obtained therein by merely mechanizing variations in the Boolean equations herein disclosed. This will become more apparent when considered in connection with the parallel embodiment of the invention which will now be described.

Referring now to Fig. 5, there is shown a parallel binary coded decimal arithmetic unit, according to this invention, which utilizes only one applied shift pulse and a correction pulse for arithmetically combining corresponding decades of two binary coded decimal numbers applied as electrical signals, and for producing an electrical output signal representing the binary coded decimal result of the operation. This embodiment of the invention utilizes four basic elements similar to the four basic elements of the serial embodiment previously disclosed, namely, an arithmetic element 510, a register 512, a correction control circuit 514 and a correction transfer circuit 516.

Arithmetic element 510 includes a parallel binary adder-subtracter 518 and a carry digit flip-flop 520. Adder-subtracter 518 may be of the type disclosed in the previously mentioned copending application, Serial Number 189,318, now abandoned, and includes a plurality of input terminals which are diagrammatically shown as two terminals A and B, for simultaneously receiving electrical signals representing the four binary digits of corresponding decades of each of the two binary coded decimal numbers to be operated upon. Adder-subtracter 518 also includes two carry digit terminals C and $\bar{C}$ which are connected to two output terminals of sections I and II, respectively, of flip-flop 520, and two operation control terminals 522 and 524 which are respectively connected to an "add" control bus 558 and a "subtract" control bus 563.

The output circuitry of adder-subtracter 518 includes six conductors designated $R_1$, $R_2$, $R_3$, $R_4$, $C_4$ and $\bar{C}_4$, respectively. Conductor $R_1$ is coupled through an "and" gate 527 to a storage element, not shown, while each of conductors $R_2$, $R_3$, $R_4$, $C_4$ and $\bar{C}_4$ is connected to a first input terminal of a corresponding "and" gate in register 512, these gates being designated 528 through 532, respectively. Each of gates 527 through 532 includes a second input terminal connected to a shift pulse bus 533. The output terminal of each of gates 530, 529, and 528 is connected to a corresponding section I input terminal of three associated flip-flops 534 through 536, while the output terminal of gate 532 is connected to a section II input terminal of carry digit flip-flop 520. The output terminal of gate 531, on the other hand, is connected to one input terminal of an "or" gate 538, an output terminal of which is connected to a section I input terminal of flip-flop 520.

Register flip--flops 534 through 536 are also provided with additional input terminals 540 through 542, respectively. Application of a negative pulse signal to any one of input terminals 540 through 542 results in a reversal of the conduction states of the respective flip-flop, regardless of the existing conduction states. The associated circuitry in conjunction with input terminals 540 through 542 includes correction control circuit 514 and correction transfer circuit 516.

Correction control circuit 514 includes an "or" gate 550 and an "and" gate 552, the connections to which are identical with those of gates 50 and 52, respectively, of Fig. 2, and, therefore, need no further description. The output terminal of gate 552 is connected to one input terminal of an "or" gate 560, a second input terminal of gate 560 being connected to the section I output terminal of flip-flop 520. An output terminal of gate 560 is connected to correction transfer circuit 516. As will be described later, the potential level present at the output terminal of gate 560 is utilized for determining when a binary correction should be made.

Correction transfer circuit 516 comprises a plurality of "and" and "or" gates including three "and" gates 562, 564 and 573, each having a first input terminal connected to the output terminal of gate 560 and a second input terminal connected to a correction pulse signal bus 565. Gates 564 and 573 each includes an additional input terminal respectively connected to an output terminal of two "or" gates 556 and 575. Gate 566 is one gate of a gating matrix which also includes gates 568, 570 and 572. Since the connections and functions of these gates are identical to those of gates 66, 68, 70 and 72 of Fig. 3, no further description of the matrix is considered necessary. Similarly, gate 575 is one portion of a gating matrix which also includes gates 574 and 576, and since these gates are connected and function identically to gates 75, 74 and 76 of Fig. 3, further description may be omitted.

The output terminals of gates 564, 573 and 562 are connected to input terminals 540 through 542, respectively, of register flip-flops 534 through 536. In addition, the output terminal of gate 562 is connected to the previously described second input terminal of gate 538 of register 12. This completes the description of the various elements of the parallel embodiment of Fig. 5.

In the operation of the embodiment shown in Fig. 5, the four binary digits representing the first decade of a first binary coded decimal number to be operated upon are simultaneously applied as electrical signals to the A input terminals of adder-subtracter 518 while the four binary digits of the first decade of a second decimal coded binary number to be operated upon are applied simultaneously as electrical signals to the B input terminals. An additional signal is impressed on adder-subtracter 518, at either of terminals 522 and 524, for indicating the operational orders "and" and "subtract," respectively.

Adder-subtracter 518 functions to combine the electrical signals applied to the input terminals in accordance with the operational signal level of "add" or "subtract" applied, and to produce an output signal level on each of output conductors $R_1$, $R_2$, $R_3$, $R_4$, $C_4$ and $\bar{C}_4$. The output signals on conductors $R_1$, $R_2$, $R_3$, and $R_4$ represent electrically the first four binary digits of the true binary result of the arithmetic operation, while the signal levels on output conductors $C_4$ and $\bar{C}_4$ represent the fifth binary digit of the true binary result, or stated differently, represent the true binary carry from the arithmetic operation.

Upon application of a shift pulse to gates 527 through 532, the signal corresponding to the first place binary result digit is shifted to the storage element, the signals corresponding to the second, third and fourth place binary digits of the true binary result are shifted into flip-flops 536, 535 and 534, respectively, while the signal corresponding to the binary carry digit is shifted into carry digit flip-flop 520. As discussed previously in connection with Fig. 1, the stored result may or may not be in the desired binary coded decimal form, as indicated by the magnitude of the number stored in register 512 and carry digit flip-flop 520. It is, therefore, necessary to sense whether a binary correction should be made upon the stored result.

Correction control circuit 514 functions in a manner similar to correction control circuit 14 of Fig. 1, with the exception that a high potential level corresponding to a correction signal L is produced at the output of gate 560 if a binary correction is indicated, whereas a negative pulse was produced at the output of gate 60 of Fig. 1. This may be explained by the fact that although correction control circuit 514 is responsive to a stored carry-digit signal or to a stored signal corresponding to binary number larger than nine, the correction pulse for making a correction transfer is applied to correction transfer circuit 516 rather than correction control circuit 514.

At a predetermined time after the signals representing the true binary arithmetic result are shifted into register 512, a negative correction pulse signal is applied through bus 565 to gates 562, 564 and 573 of correction transfer circuit 516. If a correction to binary coded decimal has been sensed by correction control circuit 514, the correction signal L will appear at gates 562, 564 and 573 at the time the correction pulse is applied to these gates. A negative correction signal pulse will, therefore, appear at the output terminal of gate 562 for changing the conduction states of flip-flop 536 and for setting up a carry digit signal in flip-flop 520.

Similarly, in accordance with the rules for correction disclosed in the description of Fig. 1, a correction signal will appear at the respective output terminals of gates 564 and 573 if the output potential levels on gates 566 and 575, respectively, are high. A correction signal at the output terminal of gate 575 will change the conduction states of flip-flop 535, while a correction signal at the output terminal of gate 564 changes the conduction states of flip-flop 534.

The binary digit signals stored in register 512 and flip-flop 520 after the application of the correction pulse signal correspond to the desired binary coded decimal result and carry digit, respectively. It is understood, of course, that the first binary digit signal of the result is not stored in register 512 because it was transmitted directly from adder-subtracter 518 to a storage element, since no correction is made on this digit.

The binary digit signals stored in register 512 may now be shifted to a storage element by application of a negative pulse to the input terminal of section II of each of flip-flops 534 through 536. The circuitry for shifting the result signal from register 512 to the storage element may be accomplished by utilizing any conventional shifting circuitry, not shown in Fig. 5, for purposes of clarity. It will also be apparent to those skilled in the art that the shift pulse applied to flip-flops 534 through 536 for shifting out the binary result signal may also be utilized for resetting the register flip-flops to binary digit 0 states, in preparation for the arithmetic operation to be performed on the succeeding decade signals of the binary coded decimal numbers being operated upon.

The parallel embodiment of the invention shown in Fig. 5 may now perform the desired arithmetic operation on the electrical signals representing the succeeding decades of the binary coded decimal numbers being operated upon. It will be noted that since the section I and II output terminals of carry digit flip-flop 520 are connected to input terminals C and $\bar{C}$, respectively, of adder-subtracter 518, a carry digit signal resulting from the arithmetic operation on a preceding decade and stored in flip-flop 520 may be included in the arithmetic operation on the following decade.

This completes the description of the parallel binary coded decimal arithmetic unit shown in Fig. 5. The principal advantage of the parallel unit over the serial unit shown in Fig. 1 is that the operational time is decreased. More specifically, only a shift pulse and a correction pulse are applied to the parallel unit for obtaining the binary coded decimal result for each decade, whereas the serial embodiment utilizes a correction pulse and a plurality of shift and operation pulses for obtaining the desired result. However, there is a common factor which limits the speed of operation of both the serial and parallel embodiments described, namely, that the true binary result is first shifted into a register, and then corrected, when necessary, to binary coded decimal form.

In order to obtain still faster speed of operation in performing an arithmetic operation on two binary coded decimal numbers, the true binary result of the operation may be corrected, when required, before the operational result is stored in the register. In this manner, the binary result which is to be stored is already in the desired binary coded decimal form. An embodiment of the present invention which functions in this manner is shown in Fig. 6.

Referring now to Fig. 6, there is shown a parallel arithmetic unit which includes the four basic elements previously set forth, namely, an arithmetic element 610, a register 612, a correction control circuit 614 and a correction transfer circuit 616.

Arithmetic element 610 includes a parallel adder-subtracter similar to adder-subtracter 518 of Fig. 5, herein shown in more detailed form for reasons of clarity. The adder-subtracter includes four full adders 621 through 624 corresponding to the four binary digits of each decade of the decimal coded binary numbers being operated upon, each of adders 621 through 624 having four input terminals for receiving electrical signals representing the corresponding binary digits of the applied numbers. Each of adders 621 through 624 also includes four output terminals for presenting as electrical signals the result and carry digits, and their complements, of the performed arithmetic operation. The carry digit output signal from adder 624 is applied to two input terminals of adder 623, these connections being repeated from adder to adder with the exception that the carry digit output from adder 621 is connected to a gate matrix which will be described later. The control terminals for controlling the arithmetic operation performed are similar to those shown in Figs. 1 and 5, and therefore need not be shown.

Arithmetic element 610 also includes an overriding carry digit flip-flop 625 which may be of the type disclosed in my copending U.S. patent application Serial Number 245,737, filed September 8, 1951, and entitled "Triggering Networks for Flip-Flop Circuits." The action of flip-flop 625 is such that a pulse applied to both the section I and II input terminals results in a high potential level at the output terminal of section I, whereas a pulse applied only at the section II input terminal results in a high potential level at the output terminal of section II. Flip-flop 625 is utilized for storing the carry digit of the decimal coded binary result for inclusion in the arithmetic operation performed on a succeeding decade of the decimal coded binary numbers applied as electrical signals to arithmetic element 610.

Register 12 may be any conventional storage element, and is here shown as a register utilizing four overriding flip-flops 634 through 637, each flip-flop being associated with a corresponding binary digit of the binary coded decimal result desired. The associated circuitry of register 512 includes four "and" gates 640 through 643, each gate being associated with a corresponding register flip-flop and having its output terminal connected to the section I input terminal thereof. A first input terminal on each of gates 640 through 643 is connected to a timing or clock pulse bus 646 which is also connected to the section II input terminals of flip-flops 634 through 637. The electrical action of overriding flip-flops 634 through 637 is similar to that of carry digit flip-flop 625, and, therefore, needs no further description.

A second input terminal on each of gates 640 through 643 is electrically coupled to arithmetic element 610 through a gating matrix of correction-transfer circuit 616, which in turn is connected to a gating matrix in correction control circuit 614. In order to store the binary digit 1 in any of the register flip-flops, the potential level at the second input terminal of the associated gate must be high.

The connections and functions of the various gates included in correction control circuit 614 and correction transfer circuit 616 will be most clearly described and understood by considering the operation of this embodiment of the invention and by expressing the operation of the gating matrices in Boolean notation.

In operation, corresponding decades of the two binary coded decimal numbers to be operated upon are applied as electrical signals to arithmetic element 610 which electronically performs the desired arithmetic operation of "add" or "subtract" and produces a true binary result which is represented by potential levels at the output terminals of full adders 621 through 624. For example, the first binary digit of the true binary result is represented by complementary signal levels at two output terminals $R_1$ and $\bar{R}_1$ of adder 624. The other true binary result digits are similarly represented by complementary signals at output terminals $R_2$ and $\bar{R}_2$, $R_3$ and $\bar{R}_3$, and $R_4$ and $\bar{R}_4$, while the carry digit is indicated by complementary potential levels at two output terminals $C_4$ and $\bar{C}_4$ of adder 621.

In order to sense or determine if a correction to binary coded decimal form is necessary, correction control circuit 614 generates two complementary correction level signals L and $\bar{L}$ which appear at the output terminal of an "or" gate 650 and the output terminal of an "and" gate 652, respectively. If level L is high and level $\bar{L}$ is low, a binary correction is indicated, whereas if level $\bar{L}$ is high and level L is low, the true binary result is already in binary coded decimal form and no binary correction should be made.

The correction level signals L and $\bar{L}$ may be expressed by the following Boolean equations:

$$L=C_4+P_1(R_2+R_3)R_4 \quad (3)$$

$$\bar{L}=\bar{C}_4(\bar{P}_1+\bar{R}_4+\bar{R}_2\bar{R}_3) \quad (4)$$

Equations 3 and 4 will be recognized as the Boolean expressions for the conditions of correction discussed in the description of Fig. 1. In other words, Equation 3 states that a correction should occur if a carry digit is present in the true binary result ($C_4$), or if the order is add ($P_1$) and the fourth binary result digit is one ($R_4$) and either the second or third binary result digit is one ($R_2+R_3$). Similarly, Equation 4 states that no correction should be made if there is no carry digit ($\bar{C}_4$) and the operational order is "subtract" ($\bar{P}_1$), or the fourth binary result digit is zero ($\bar{R}_4$), or the second and third binary result digits are zero ($\bar{R}_2\bar{R}_3$). By mechanizing Equations 3 and 4, therefore, correction levels L and $\bar{L}$ may be produced.

As shown in Fig. 6, Equation 3 is mechanized by gate 650, an "and" gate 654 and an "or" gate 656. Gate 656 is utilized for combining the electrical signals representing the second and third binary digits ($R_2+R_3$) while gate 654 is utilized for combining the output signal from gate 656 and the electrical signals representing the order "add" ($P_1$) and the fourth binary result digit ($R_4$). Gate 650, in turn, combines the output signal from gate 654 and the electrical signal representing a carry digit ($C_4$), thereby producing a high level output signal (L) when the conditions of Equation 3 are satisfied. Equation 4 is mechanized in a similar manner by gate 652, an "or" gate 658 and an "and" gate 659. Gate 659 is utilized for combining the signals representing the complements of the second and third binary result digits ($\bar{R}_2\bar{R}_3$), while gate 658 combines the signal output from gate 659 and the electrical signals representing the order "add" ($P_1$) and the complement of the fourth binary result digit ($\bar{R}_4$). Gate 652, in turn, combines the output signal from gate 658 and the signal representing the complement of the carry digit ($\bar{C}_4$), thereby producing a high level output signal ($\bar{L}$) when the conditions of Equation 4 are satisfied.

Correction control signals L and $\bar{L}$ are applied to correction transfer circuit 616 for producing electrical signals representing the binary coded decimal arithmetic result of the arithmetic operation, the potential levels appearing at the second input terminals of each of gates 640 through 643 representing the binary digits of the binary coded decimal result. For example, a high potential level signal at gate 643 will indicate a first binary result digit of 1, whereas a complementary low level signal will represent a first binary result digit of 0.

In order to obtain output levels representing the binary coded decimal result, the gating matrix of correction transfer circuit 616 may be considered as the mechanized equivalent of the following Boolean equations wherein $K_1$, $K_2$, $K_3$ and $K_4$ represent the conditions under which the first, second, third and fourth binary coded decimal result digits, respectively, are equal to the binary digit 1.

$$K_1=(P_1+\bar{P}_1)R_1=R_1 \quad (5)$$

$$K_2=(P_1+\bar{P}_1)(R_2\bar{L}+\bar{R}_2L)=\bar{L}R_2+L\bar{R}_2 \quad (6)$$

$$K_3=\bar{L}R_3+P_1L\bar{R}_2\bar{R}_3+\bar{P}_1LR_2\bar{R}_3 \quad (7)$$

$$K_4=\bar{L}R_4+P_1L\bar{R}_2\bar{R}_3R_4+\bar{P}_1LR_2R_3R_4+P_1L(R_2+R_3)\bar{R}_4+\bar{P}_1L(\bar{R}_2+\bar{R}_3)\bar{R}_4 \quad (8)$$

Equations 5 through 8 may be recognized as the logical development of the rules for change discussed in connection with Fig. 1. For example, if Equation 7 is considered, the third binary digit of the binary coded decimal result is 1 if any of the three conditions represented by the three terms of Equation 7 produces the binary digit 1. The first term indicates that $K_3$ is 1 when there is no correction ($\bar{L}$) and when the third digit of the true binary result of the arithmetic operation is 1 ($R_3$). The second term indicates that $K_3$ is 1 when the operational order is "add" ($P_1$) and there is a binary correction (L) and when the second and third true binary result digits are both 0 ($\bar{R}_2\bar{R}_3$). The third term indicates that $K_3$ is 1 when the operational order is "subtract" ($\bar{P}_1$) and there is a binary correction (L) and when the second true binary digit is 1 and the third true binary result digit is 0 ($R_2\bar{R}_3$).

Equations 5, 6 and 8 may be examined in a similar manner to illustrate the relation between the true binary result of the arithmetic operation and the binary coded decimal result desired. It will be noted that if the true binary result is such that a no correction signal ($\bar{L}$) is generated, the binary coded decimal result $K_4K_3K_2K_1$ is equal to the true binary result $R_4R_3R_2R_1$. The terms of Equations 5 through 8 which include a correction signal (L), may, therefore, be considered as those condtions under which a correction should occur by combining the binary number 0110 and the true binary result, as discussed in connection with Fig. 1.

Referring again to Fig. 6, the mechanization of Equations 5 through 8 will now be described. Equation 5 is mechanized by merely connecting output terminal $R_1$ of full adder 624 directly to the second input terminal of gate 643, since Equation 5 contains only one term ($R_1$). In order to more fully understand the reason for omitting the term ($P_1+\bar{P}_1$), one has only to appreciate the significance of this term. Since an electrical signal corresponding to the arithmetic order add ($P_1$) or the arithmetic order subtract ($\bar{P}_1$) must be present in order to perform an arithmetic operation, it may be seen that the term ($P_1+\bar{P}_1$) must always produce an electrical signal, regardless of the order applied to the arithmetic unit. This term may, therefore, be eliminated in mechanizing the equations.

In mechanizing Equation 6, an "and" gate 660 is utilized for combining the signals representing the term ($\bar{L}R_2$), while an "and" gate 662 combines the signals corresponding to the term ($L\bar{R}_2$). The two terms of Equation 6 are then combined by an "or" gate 664, an output terminal of which is connected to the second input terminal of gate 642.

Equation 7 is mechanized in a similar manner, except that more gates are utilized because three terms are present in the equation. An "and" gate 670 combines the signals representing the term $\bar{L}R_3$, while two "and" gates 659 and 672 combine the signals corresponding to the term $(P_1L\bar{R}_2\bar{R}_3)$. The signals corresponding to the term $(\bar{P}_1LR_2\bar{R}_3)$ are, in turn, combined by two "and" gates 674 and 676. The signals corresponding to the terms of Equation 7 are then combined by an "or" gate 678 and applied to gate 641.

It may be recalled that gate 659 was also utilized in mechanizing Equation 4 for producing a no correction signal $(\bar{L})$. The use of one gate in the mechanization of several equations may occur whenever the equations require a like combination of signals in a term of the equation, and is, therefore, one manner in which the number of electrical components utilized may be reduced. In a similar manner, the second and third terms of Equation 7 also utilize two "and" gates 680 and 682, respectively, for combining the electrical signals corresponding to a binary correction (L) and the orders "add" $(P_1)$ and "subtract" $(\bar{P}_1)$. Gates 680 and 682 were not included when reciting the gates utilized for mechanizing Equation 7 because these gates are also used in mechanizing Equation 8.

The terms of Equation 8 are mechanized utilizing five "and" gates 690 through 694, respectively, and are combined to form Equation 8 by an "or" gate 695. Gate 690 combines the electrical signals corresponding to the term $(\bar{L}R_4)$, while gate 691, in conjunction with gates 656 and 680, combines the electrical signals corresponding to the term $(P_1L(R_2+R_3)\bar{R}_4)$. Gate 692, in turn, combines the electrical signals corresponding to the term $(\bar{P}_1LR_2\bar{R}_3R_4)$, whereas gate 693, in conjunction with gate 682 and an "or" gate 696, combines the electrical signals corresponding to the term $(\bar{P}_1L(\bar{R}_2+\bar{R}_3)\bar{R}_4)$. The electrical signals corresponding to the term $(P_1L\bar{R}_2\bar{R}_3R_4)$ are combined by gate 694 in conjunction with gate 672.

This completes the description of the gating matrix utilized for producing the electrical signals corresponding to the binary digits of the binary coded decimal result. It is apparent that in the operation of the parallel arithmetic unit shown in Fig. 6, electrical signals representing the binary coded decimal result are produced without the application of an external correction pulse and before the result is stored in register 612.

Upon the application of a timing pulse to bus 646, the binary coded decimal result of the arithmetic operation is shifted into the register flip-flop of register 612. In addition, the timing pulse is applied at a first input terminal of an "and" gate 666 for storing in flip-flop 625 an electrical signal representing the carry digit resulting from the arithmetic operation or binary correction. The result stored in register 612 may now be shifted to another conventional storage device, if desired, thereby preparing the arithmetic unit for operation on succeeding decades of the applied binary signals.

It is to be understood, that other conventional storage elements may be used for storing, decade by decade, the binary coded decimal result signals produced, and that register 612 is not intended to define the limits of the invention. In addition, it is clear that gating matrices other than those disclosed may be utilized for mechanizing the Boolean equations herein presented. Obviously, mere rearrangement of the terms of these equations by one skilled in the art will provide variations in the gating matrices which will perform the same function as the circuits here shown.

It should be understood, therefore, that the foregoing disclosure relates to only preferred embodiments of the invention and that numerous modifications and alterations may be made therein without departing from the spirit and scope of the invention as set forth in the appended claims.

What is claimed as new is:

1. A binary coded decimal arithmetic unit for electronically performing the arithmetic operation of addition or subtraction upon first and second electrical signals corresponding to first and second binary coded decimal numbers, respectively, said unit comprising: an electrical arithmetic element for combining the first and second electrical signals to produce an electrical output signal corresponding to the true binary result of the arithmetic operation; an electrical storage element for storing electrical signals corresponding to binary numbers, said storage element being connected to said arithmetic element for electrically storing said output signal as a first result signal; an electrical control network connected to said arithmetic element and to said storage element, said control network being responsive to said first result signal for producing an electrical control signal when said first result signal corresponds to a binary number which is not in binary coded decimal form; and a transfer network electrically connected to said storage element and to said control network; said transfer network being responsive to said control signal for converting said first result signal stored in said storage element to a second result signal corresponding to the binary coded decimal equivalent of the true binary result of the operation.

2. An arithmetic unit for electrically performing the arithmetic operation of addition or subtraction upon first and second groups of electrical signals corresponding to first and second binary coded decimal numbers, respectively, said unit comprising: a serially operable arithmetic element for electrically combining the first and second groups of electrical signals to produce first, second, third, fourth, and fifth electrical digit signals corresponding to the five successive binary digits, respectively, of the true binary result of the arithmetic operation; storage means for storing electrical signals corresponding to binary numbers, said storage means being connected to said arithmetic element for storing said electrical digit signals; a correction control network, including a plurality of electrical gating circuits, connected to said storage means, said network being responsive to said second, third, fourth, and fifth digit signals for producing a control signal when the true binary result of the operation is larger than the binary number 01001; and a correction transfer circuit electrically connected to said storage means and to said control network, said transfer circuit being responsive to said control signal for electrically converting the stored digit signals to electrical signals corresponding to the binary digits, respectively, of the binary coded decimal equivalent of the true binary result of the operation.

3. An arithmetic unit for electrically performing the arithmetic operation of addition or subtraction upon first and second groups of electrical signals corresponding to the binary digits of first and second binary coded decimal numbers, respectively; said unit comprising: an arithmetic element including a serial adder-subtracter for electrically combining the first and second groups of electrical signals to produce first, second, third, fourth and fifth electrical digit signals corresponding to the five successive binary digits, respectively, of the true binary result of the operation, and a first storage element for storing said fifth digit signal; a second storage element connected to said adder-subtracter for storing said first, second, third, and fourth digit signals; a correction control network, connected to said first and second storage elements and responsive to said digit signals for producing a correction signal when the binary number corresponding to said digit signals is larger than the binary number 01001; and a correction transfer circuit electrically connected to said first and second storage elements and to said correction control network, said transfer circuit being responsive to said correction signal for converting the digit signals stored in said storage elements to electrical signals corresponding to the binary digits, respectively, of the binary coded decimal result of the arithmetic operation.

4. An arithmetic unit for electrically performing an arithmetic operation upon first and second electrical signals corresponding to two binary coded decimal numbers, respectively, and for producing an electrical signal corresponding to the binary coded decimal result of the operation, said unit comprising: an electrical parallel adder-subtracter for combining the first and second electrical signals to produce an electrical output signal corresponding to the true binary result of the arithmetic operation; electrical storage means connected to said adder-subtracter for storing said output signal; an electrical control circuit electrically coupled to said storage means and responsive to said stored output signal for producing an electrical control signal when said stored output signal corresponds to a binary number which is not in binary coded decimal form; and an electrical transfer circuit connected to said storage means and to said control circuit, said transfer circuit being responsive to said control signal for electrically converting said stored output signal to an electrical signal corresponding to the binary coded decimal result of the arithmetic operation.

5. An arithmetic unit for electrically performing an arithmetic operation of either addition or subtraction upon first and second electrical signals corresponding to two binary coded decimal numbers, respectively, said unit comprising: an electronic parallel adder-subtracter for combining the first and second electrical signals to simultaneously produce a plurality of electrical digit signals $R_1$, $R_2$, $R_3$, $R_4$ and $C_4$ corresponding to the first, second, third, fourth and fifth binary digits, respectively, of the true binary result of the arithmetic operation; electronic storage means connected to said adder-subtracter for storing said plurality of electrical digit signals; an electrical control network connected to said storage means and responsive to the stored digit signals for producing an electrical control signal, L, when said stored digit signals correspond to a binary number which is not in binary coded decimal form, said electrical control signal being defined by the Boolean equation $$L=C_4+(R_2+R_3)R_4$$

and an electrical transfer network connected to said control network and to said electronic storage means, said transfer network including a plurality of electronic gates responsive to said control signal for electronically converting said digit signals to electrical signals corresponding to the binary digits, respectively, of the binary coded decimal result of the arithmetic operation.

References Cited in the file of this patent

UNITED STATES PATENTS

| | | |
|---|---|---|
| 2,364,540 | Luhn | Dec. 5, 1944 |
| 2,375,332 | Torkelson | May 8, 1945 |
| 2,394,925 | Luhn | Feb. 12, 1946 |
| 2,538,615 | Carbrey | Jan. 16, 1951 |
| 2,609,143 | Stibitz | Sept. 2, 1952 |
| 2,623,115 | Woods-Hill et al. | Dec. 23, 1952 |
| 2,623,171 | Woods-Hill et al. | Dec. 23, 1952 |
| 2,668,661 | Stibitz | Feb. 9, 1954 |
| 2,703,202 | Cartwright | Mar. 1, 1955 |

FOREIGN PATENTS

| | | |
|---|---|---|
| 485,995 | Belgium | Nov. 24, 1948 |

OTHER REFERENCES

Proc. of the IRE, "A Digital Computer for Scientific Applications," by West et al., pages 1452 to 1460, December 1948.

Investigations for Design of Digital Calculating Machinery, Progress Report No. 7, covering period Nov. 10, 1949 to February 10, 1950, Harvard University, received at Armed Services Technical Information Agency (Library of Congress) on March 22, 1950, pages III–25 to III–47.

High Speed Computing Devices, ERA, Copyright July 28, 1950, by McGraw-Hill Book Co., pages 290–292.

Synthesis of Electronic Computing and Control Circuits, Harvard University Press, May 17, 1951, pages 12 and 184–194.

UNITED STATES PATENT OFFICE

CERTIFICATE OF CORRECTION

March 15, 1960

Patent No. 2,928,601

Daniel L. Curtis

It is hereby certified that error appears in the printed specification of the above numbered patent requiring correction and that the said Letters Patent should read as corrected below.

Column 3, lines 60 and 61, for "October 10, 1050," read -- October 10, 1950, --; lines 69 and 70, for "decical" read -- decimal --; column 8, line 38, right-hand portion of equation (1), for "$+a33^3+c2^4$" read --$+a32^3+c2^4$ --; column 11, in the table at the end of the column, under the heading "Add", last line thereof, last equation before the first plus sign, for "$(r_3\bar{r}_2)$" read $(\bar{r}_3\bar{r}_2)$ --.

Signed and sealed this 18th day of October 1960.

(SEAL)
Attest:
KARL H. AXLINE
Attesting Officer

ROBERT C. WATSON
Commissioner of Patents